United States Patent
Reh et al.

(10) Patent No.: US 9,760,751 B2
(45) Date of Patent: Sep. 12, 2017

(54) METHOD AND SYSTEM FOR IDENTIFYING PIECES OF FLIGHT BAGGAGE

(71) Applicant: RIMOWA Electronic Tag GmbH, Hamburg (DE)

(72) Inventors: Jan Reh, Hamburg (DE); Dieter Morszeck, Köln (DE)

(73) Assignee: RIMOWA Electronic Tag GmbH, Hamburg (DE)

( * ) Notice: Subject to any disclaimer, the term of this patent is extended or adjusted under 35 U.S.C. 154(b) by 0 days.

(21) Appl. No.: 15/372,700

(22) Filed: Dec. 8, 2016

(65) Prior Publication Data

US 2017/0091500 A1 Mar. 30, 2017

Related U.S. Application Data

(63) Continuation of application No. PCT/EP2016/054993, filed on Mar. 9, 2016.

(30) Foreign Application Priority Data

Mar. 9, 2015 (EP) ..................... 15158310

(51) Int. Cl.
G07B 15/02 (2011.01)
G06K 7/10 (2006.01)
A45C 13/42 (2006.01)
G06Q 10/08 (2012.01)

(52) U.S. Cl.
CPC .......... *G06K 7/10366* (2013.01); *A45C 13/42* (2013.01); *G06Q 10/0833* (2013.01)

(58) Field of Classification Search
USPC ........................ 235/492, 380, 384
See application file for complete search history.

(56) References Cited

U.S. PATENT DOCUMENTS

| 2012/0052879 | A1 | 3/2012 | Wildon et al. | |
|---|---|---|---|---|
| 2014/0291132 | A1 | 10/2014 | Todd | |
| 2014/0291405 | A1* | 10/2014 | Harkes | G06K 19/0716 235/492 |
| 2015/0062879 | A1 | 3/2015 | Tait | |
| 2015/0122893 | A1* | 5/2015 | Warther | G06K 7/10366 235/492 |

FOREIGN PATENT DOCUMENTS

| EP | 2737820 A1 | 6/2014 |
|---|---|---|
| GB | 2500054 A | 9/2013 |
| WO | 2011093780 A1 | 8/2011 |
| WO | 2012152745 A1 | 11/2012 |

OTHER PUBLICATIONS

International Search Report dated May 19, 2016 in corresponding Application No. PCT/EP2016/054993; 11 pgs.
John Anderson, "Electronic luggage tag lets travelers check-in bags from home", Feb. 12, 2016, URL: http://www.gizmag.com/rimowa-electronic-tag/41794/, Accessed: Sep. 27, 2016.

* cited by examiner

*Primary Examiner* — Daniel Hess
(74) *Attorney, Agent, or Firm* — Maier & Maier, PLLC

(57) ABSTRACT

A method for identifying a piece of baggage. An electronic display is activated in order to set the display ready for receipt, the display being integrated in the piece of flight baggage and configured as an electronic tag. Flight and personal data necessary for a flight is transmitted from a check in mechanism to the display. The flight and personal data is represented graphically on a display surface of the display.

42 Claims, 7 Drawing Sheets

METHOD AND SYSTEM FOR IDENTIFYING PIECES OF FLIGHT BAGGAGE

The invention relates to a method and a system for identifying pieces of flight baggage as defined in claim 1 and claim 13, respectively, as well as to a piece of flight baggage as defined in claim 19.

Methods and systems for identifying pieces of flight baggage, in particular suitcases, are known, wherein the piece of flight baggage is checked in by means of a check-in device, in particular a cell phone, a computer, a check-in counter or a check-in automat. So-called "baggage tags" are then printed for the piece of flight baggage and fastened to the piece of flight baggage. Flight and personal data important for the flight are indicated on the baggage tags. The piece of baggage provided with the baggage tag may then be handed in at a baggage drop off device, in particular a baggage drop off counter, a check-in counter with baggage drop-off or a self-service drop off counter. However, there is an increasing demand for further automation and simplification of the method for identifying pieces of flight luggage.

Therefore, it is an object of the present invention to provide a method and a system for identifying pieces of flight baggage, as well as a piece of flight baggage that is automated and simplified, respectively.

This object is achieved with the features of claims 1, 13 and 19.

In a method for identifying pieces of flight baggage according to the present invention, the following steps are advantageously provided:
- activating an electronic display means in order to set the display ready for receipt, the display means being integrated in the piece of flight baggage and configured as an electronic tag,
- transmitting flight and personal data necessary for a flight from a check in means to the display means,
- representing the flight and personal data graphically on a display surface of the display means.

According to the present method it is possible to represent flight and personal data on a display means integrated in the piece of baggage and designed as an electronic tag. It is also possible to transmit flight and personal data to the display means. Further, the method of the present invention has the advantage that the flight and personal data cannot be manipulated, since they are transmitted only after the activation of the display means by which the display means is set ready for receipt.

The present method thus has the advantage that the flight and personal data represented on the electronic tag, i.e. on the display means, are as well secured against manipulation as the flight and personal data indicated on a conventional paper baggage tag.

The display means can be ready for receipt only within a defined time window after activation of the display means. This offers an additional security advantage, since the display surface on the display means or on the electronic tag can be modified only within a defined time window after activation of the display means.

The check-in means may be a cell phone, a computer, a check-in counter or a check-in automat. A passenger may check in at this check-in means in the usual manner.

The piece of flight baggage with the display means on which the flight and personal data are displayed may be handed in at a baggage drop-off means. The baggage drop-off means may be a baggage drop-off counter, a check-in counter with baggage drop-off or a self-service drop-off counter.

The electronic display means may be activated by manual activation of an activation means arranged on the piece of flight baggage. This is another security advantage, since the activation can only be made manually. The activation means may preferably be arranged at the display means. As an alternative, the activation means may be arranged on a suitcase handle or a trolley handle or a lock of the piece of flight baggage.

The activation means may be arranged inside the piece of flight baggage. Again, this is another security advantage, since the display means can only be activated by the owner of the piece of flight baggage, because only this person can open the lock of the piece of flight baggage.

As a further alternative, for example, an external activation means associated to the display means could be used to activate the display means and set it ready for receipt. Such an external activation means could function in a manner similar to a remote control for opening a car.

It may also be provided that the display means only allows the transmission of data from certain or previously specified check-in means. This may be provided in particular if the activation means is not arranged inside the piece of baggage.

The piece of baggage may be handed in at a baggage drop-off means in an airport, in particular a baggage drop-off counter, a check-in counter with baggage drop-off or a self-service drop-off counter.

The piece of flight baggage may comprise a body of the piece of baggage in which the display means is arranged.

A shielding means may protect the activation means against undesired actuation.

If the activation means is arranged in the region of the body of the piece of flight baggage or the display means, in particular if the activation means is designed as a button, the shielding means prevents an undesired actuation of the activation means. If, for example, the button of the activation means is arranged inside a suitcase, the shielding means protects the button against unintended actuation by an impact from objects located in the piece of flight baggage. It is conceivable that objects inside the piece of baggage are shifted during transportation of the piece of baggage and might possibly trigger the activation means depending on how the suitcase is moved or stored. The shielding means prevents direct access to the activation means and thereby avoids unintended actuation.

The dimensions and the arrangement of the graphical display of the flight and personal data on the display surface of the display means may correspond to the dimensions and the arrangement of the indications on a conventional paper baggage tag.

The display means may comprise a currentless display. A currentless display is a display that can permanently display data without current being supplied. Current is only required to modify the displayed content. Such displays are also referred to as bi-stable displays. A battery may be provided for supplying current to the display for the purpose of modifying the displayed content.

The display means may extend substantially flush with the outer surface of the flight baggage.

The flight and personal data may be transmitted via Bluetooth. The flight and personal data correspond to the data indicated on a conventional paper baggage tag. The flight and personal data can be represented graphically on the display surface of the display means. The graphic representation of the flight and personal data on the display surface of the display means thus corresponds to the data indicated on a conventional paper baggage tag.

For flights within Europe, two green bars may be displayed at a defined distance from each other preferably at the longitudinal edges of the display means. The display surface of the display means preferably has a rectangular surface, preferably with two transversal edges and two longitudinal edges.

The graphic representation of the flight and personal data shown on the display surface of the display means may be scanned for automatic baggage transportation. Thus, the flight and personal data shown on the display surface of the display means can be scanned for baggage transportation in the same manner as the conventional paper baggage tag. Therefore, the automatic baggage transportation does not have to be adapted to the transportation of flight baggage having a display means in the form of an electronic tag.

When dropping off the piece of flight baggage, it is possible to automatically detect by means of a RFID chip arranged on the display means, whether a display means showing flight and personal data being present. In this manner, the method for dropping off the piece of flight baggage can be automated further. At a self-service drop-off counter, for example, it is automatically detected that a piece of flight baggage with a display means and flight and personal data indicated thereon is present.

It is possible to send an automatic electronic acknowledgment of the piece of flight baggage being dropped off. The electronic acknowledgment may for example be sent to the check-in means.

The piece of flight baggage may be a suitcase and the display means may be arranged on a longitudinal side of the suitcase where also a handle is provided. In this manner the flight and personal data displayed on the display means are arranged at a position similar to that of a conventional paper baggage tag that is usually arranged on the handle in the longitudinal side of the suitcase.

The display of the display means may be made of a material that includes plastics and is flexible. In this manner it is prevented that the display of the display means breaks during transportation of the piece of flight baggage and the electronic tag is no longer displayed.

Further, according to the present invention, a system for identifying a piece of flight baggage, in particular a suitcase, may be provided, which system has the following features:
- a check-in means on which flight and personal data necessary for a flight can be stored,
- a piece of flight baggage with an integrated display means designed as an electronic tag,
- an activation means for activating the display means integrated in the piece of flight baggage, so as to set the same ready for receipt, wherein it is possible to transmit flight and personal data from the check-in means to the display means while the same is ready for receipt,
- wherein the flight and personal data are adapted for representation on a display surface of the display means.

The activation means may be arranged on the piece of baggage, preferably on the display means.

The activation means may be a button arranged on the piece of baggage, preferably on the display means.

The button may be a push button or a slide button by which the display means is set ready for receipt.

The activation means may be arranged inside the piece of baggage and may be manually actuatable.

The piece of baggage may be provided with a shielding means that protects the activation means, preferably the button, against unintentional actuation.

The activation means may be provided externally of the piece of baggage.

Further, according to the present invention, a piece of flight baggage comprising a body of a piece of baggage may be provided, with the display means being arranged on the body of the piece of baggage and the body of the piece of baggage being openable and closable, while an activation means by which the display means may be activated is arranged on the body of the piece of baggage, preferably on the display means.

In this regard, the body of the piece of baggage may be composed of at least one first part of the piece of baggage and at least one second part of the piece of baggage, whereby the piece of flight baggage may be opened and closed.

The activation means may be arranged inside the body of the piece of baggage and may be adapted for manual operation.

Arranging the activation means inside the body of the piece of baggage has the particular advantage that only the authorized owner of the piece of baggage, who can open the piece of flight baggage e.g. by unlocking locks, is the only one to have access to the activation means. In particular, access to or actuation of the activation means by unauthorized third parties, e.g. during transportation of the piece of baggage, is thus avoided. With the activation means inside the piece of baggage, the same is generally protected against interference from outside.

The activation means may be a button arranged on the piece of baggage, preferably on the display means.

Further, a shielding means may be provided on the piece of flight baggage, which shielding means protects the activation means against unintentional actuation.

The shielding means may, for example, be an additional object which, for example, is arranged in front of the button in the closed state of the piece of flight baggage and thereby securely prevents access to the button. In the open state, the additional object allows access to the button so that the same can the actuated.

The shielding means may be arranged directly on the body of the piece of baggage and/or on the display means.

The shielding means may be formed by a channel arranged in front of the activation means and having an opening. The configuration of the shielding means as a channel offers the advantage that the access to the activation means, in particular to the button, is possible only via the channel.

The course of the channel and the geometry of the channel opening may be designed such that the activation means can only be accessed with a specially shaped object. In particular, the dimensions and the course of the channel may be adapted to a human finger.

In this regard, the channel may be straight or be bent once or several times. With such a design of the channel arranged in front of the activation means, an unintentional actuation of the activation means is also prevented. The channel leads form the opening at a first end to the activation means at the opposite end. The channel can be accessed only via the opening.

The channel opening of the actuation means may be covered in the closed state of the piece of baggage. This design has the particular advantage that the actuation means, especially the button, is accessible—and thus actuable and activatable—only in the open state of the piece of baggage.

The channel of the shielding means may be arranged on the first part of the body of the piece of baggage, and the channel opening may be covered by the second part of the piece of baggage when the piece of baggage is in the closed state. In this context, it may be provided that the opening of the channel is closed for example by an inner surface of the second part of the piece of baggage in the closed state. When the piece of baggage is opened, the second part of the piece of baggage moves away from the first piece of baggage and thus clears the channel opening of the shielding means. As a consequence, the channel opening of the shielding device is accessible in the open state of the piece of baggage and the activation means can be actuated via the channel.

In the closed state, the opening may be covered by a closing means.

The closing means may be arranged on the second part of the piece of baggage.

In particular, an arrangement is conceivable wherein the shielding means with the channel and the opening is arranged on the first part of body of the piece of baggage and the closing means is arranged opposite the same on the second part of the piece of baggage. In this case, the closing means has a geometry adapted to the channel opening of shielding means. In the closed state of the piece of baggage, the closing means may engage into or embrace the opening and close the same. When the piece of baggage is opened, the first part of the piece of baggage moves away from the second part of the piece of baggage and, as a consequence, the closing means is removed from the channel opening so that the latter is freely accessible.

The following is a detailed explanation of embodiments of the invention with reference to the drawings.

Figure 8:
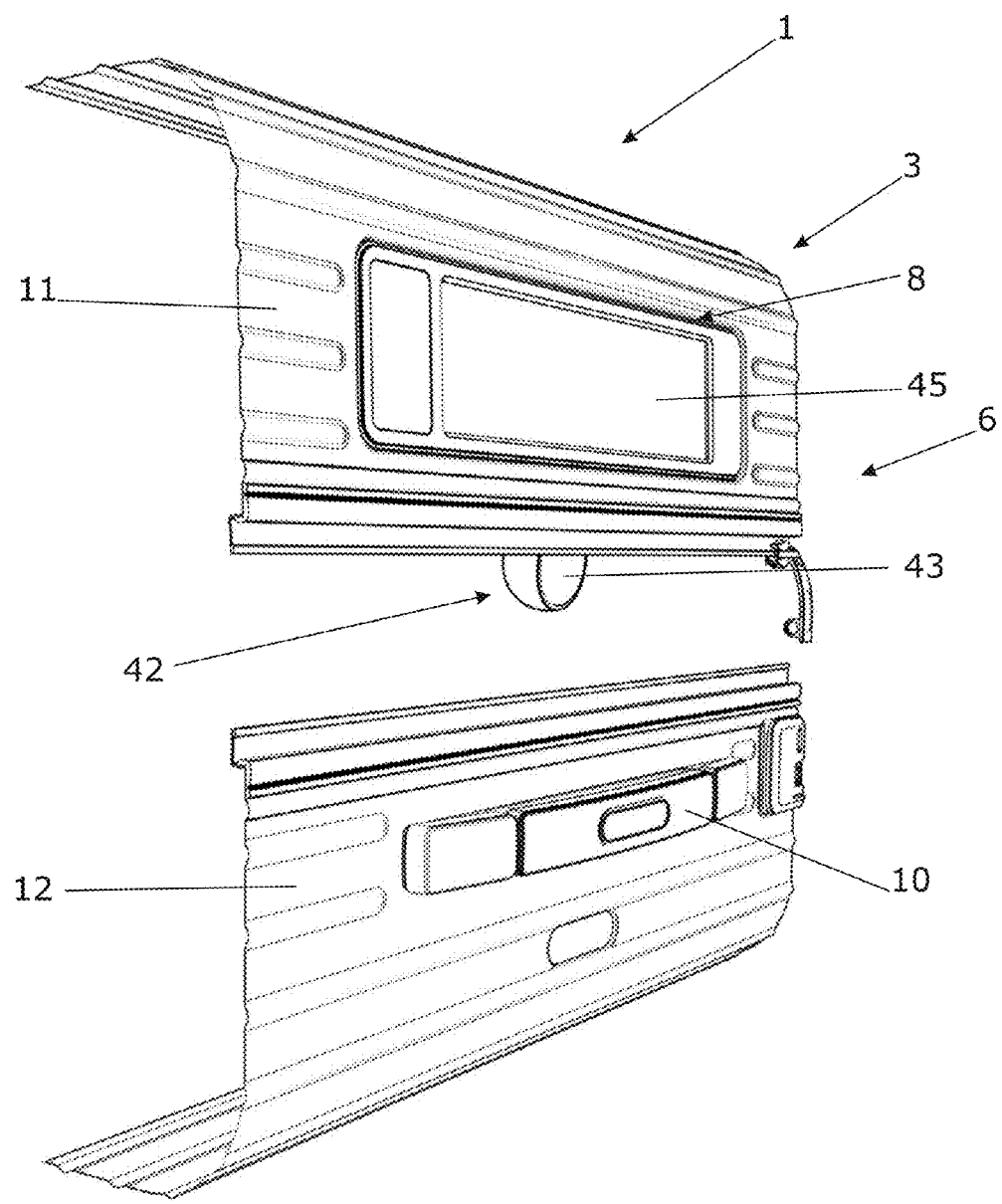
Figure 9:
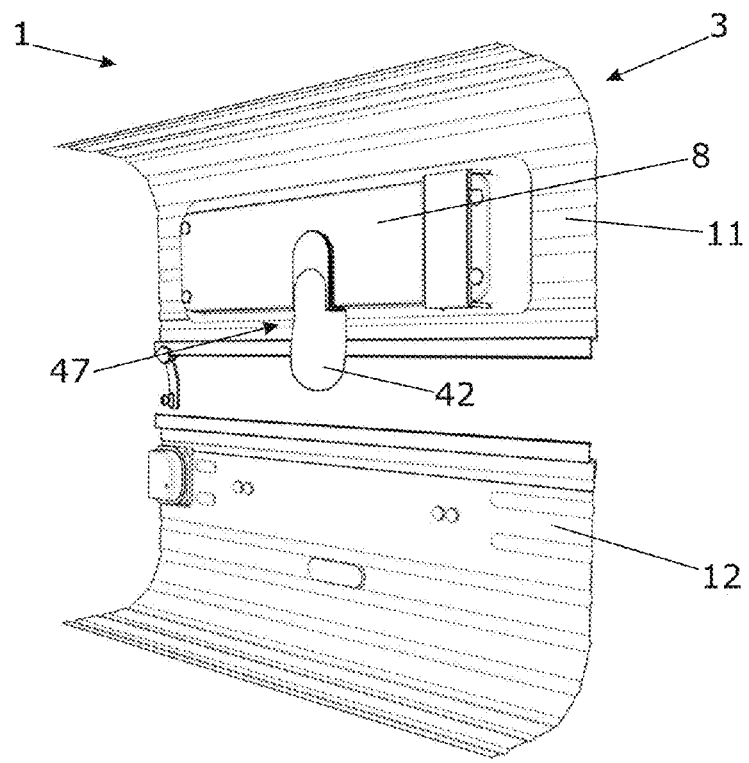
Figure 10:
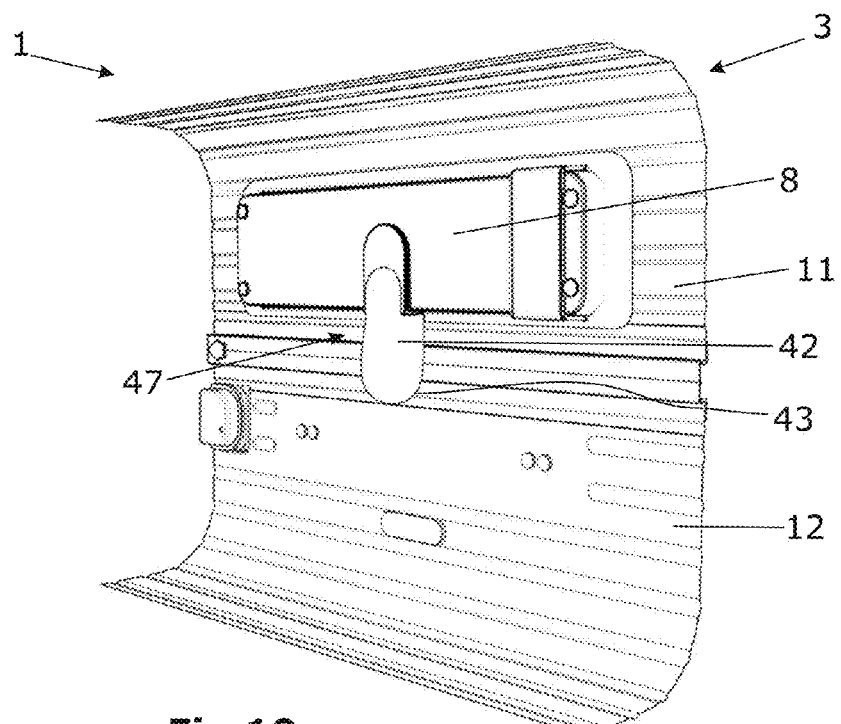
Figure 11:
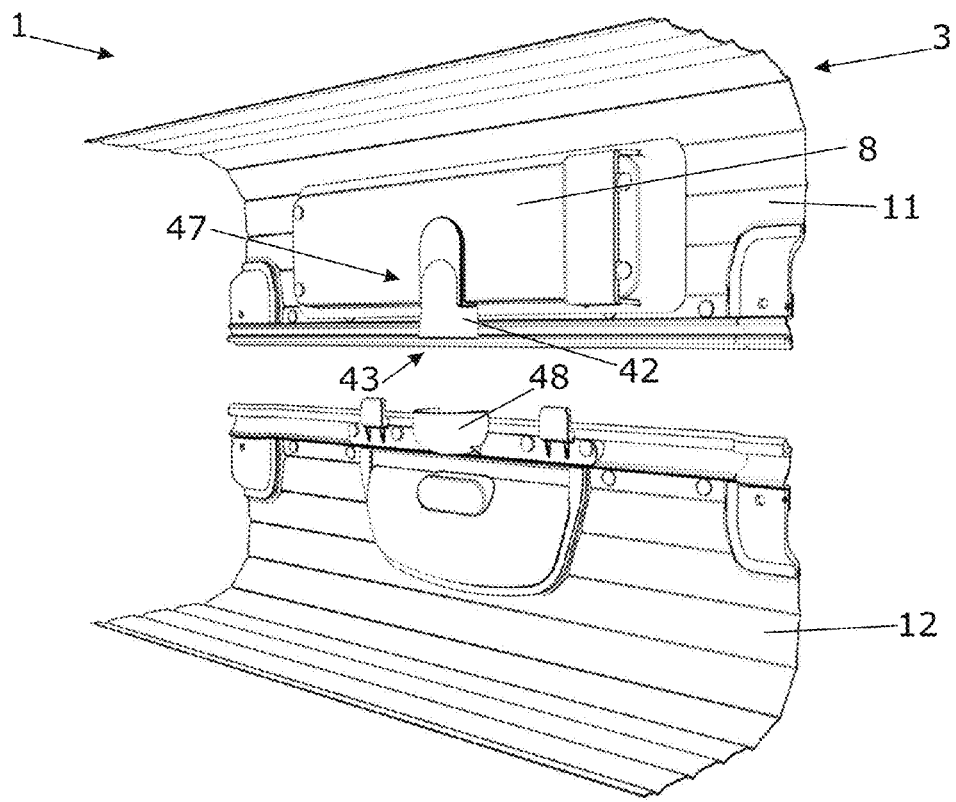
Figure 12:
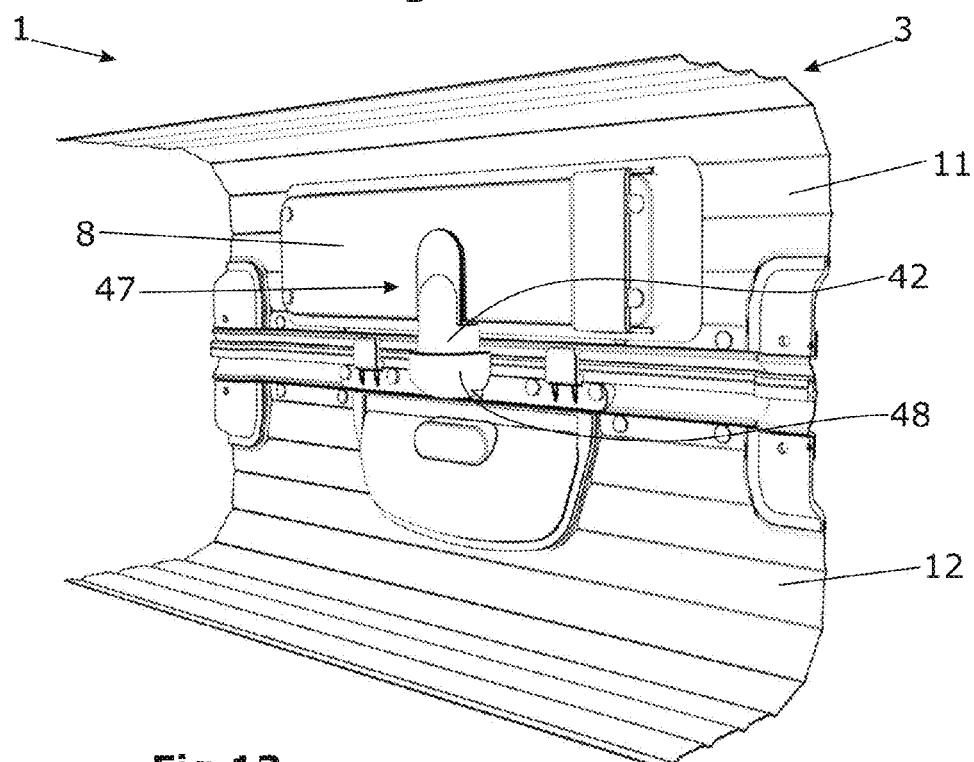

FIG. 8 is an outside view of a detail of a piece of baggage in the open state having a shielding means, FIG. 9 is an inside view of a detail of a piece of baggage in the open state having a shielding means, FIG. 10 is an inside view of a detail of a piece of baggage in the closed state having a shielding means, FIG. 11 is an inside view of an alternative embodiment of a detail of a piece of baggage in the open state having an alternative shielding means, FIG. 12 is an inside view of an alternative embodiment of a detail of a piece of baggage in the closed state having an alternative shielding means.

Figure 1:
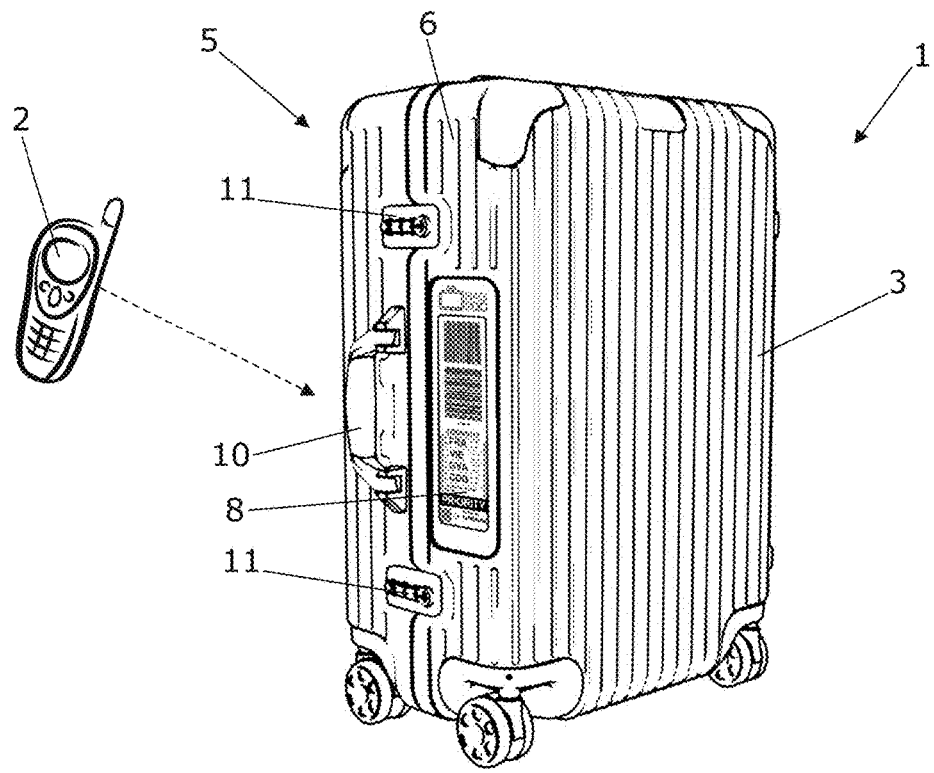
FIG. 1 shows a system for identifying a piece of flight baggage.

FIG. 1 shows a system 5 for identifying a piece of flight baggage 1. The piece of flight baggage 1 illustrated preferably is a suitcase. In the embodiment illustrated, the piece of flight baggage 1 has a body 3 of a piece of flight baggage. A display means 8 is integrated in the body 3 of the piece of flight baggage. This display means 8 is designed as an electronic tag. Further, a check-in means 2 is provided. The check-in means 2 illustrated in FIG. 1 is a cell phone. The flight and personal data necessary for a flight can be stored on the check-in means 2. The data may also be storable on the check-in means 2 in temporary manner and for a short time. An activation means 40, not illustrated in FIG. 1, is provided for activating the display means 8 integrated in the piece of flight baggage 1, so as to set the display means ready for receipt. While ready for receipt, flight and personal data can be transmitted from the check-in means 2 to the display means 8 and be displayed on a display surface 26 of the display means.

In the method for identifying a piece of flight baggage 1, first the electronic display means 8, which is integrated in the piece of flight baggage and is designed as an electronic tag, is activated so as to set the display means ready for receipt. Thereafter, the flight and personal data necessary for the flight are transmitted from the check-in means 2 to the display means 8. In the subsequent step, the flight and personal data are graphically represented on the display surface 26 of the display means 8.

As in the embodiment illustrated, the display means 8 is preferably arranged on a longitudinal side 6 of the piece of baggage 1, where a handle 10 is also arranged. In this manner, the flight and personal data that are displayed on the display means 8 are provided at a position similar to that of a conventional paper baggage tag that is usually attached to a handle 10. The activation means 40 may be arranged on the piece of baggage 1. For example, the activation means may be arranged on the handle 10, the locks, the body 3 of the piece of baggage or the display means 8. Preferably, the activation means 40 is arranged inside the piece of baggage 1. This offers the additional advantage that only the owner of the piece of baggage 1 has access to the activation means. In this manner, no unauthorized person can modify the flight and personal data on the display means 8. The transmission of the flight and personal data from the check-in means 2 to the display means 8 may be effected via Bluetooth.

Figure 2:
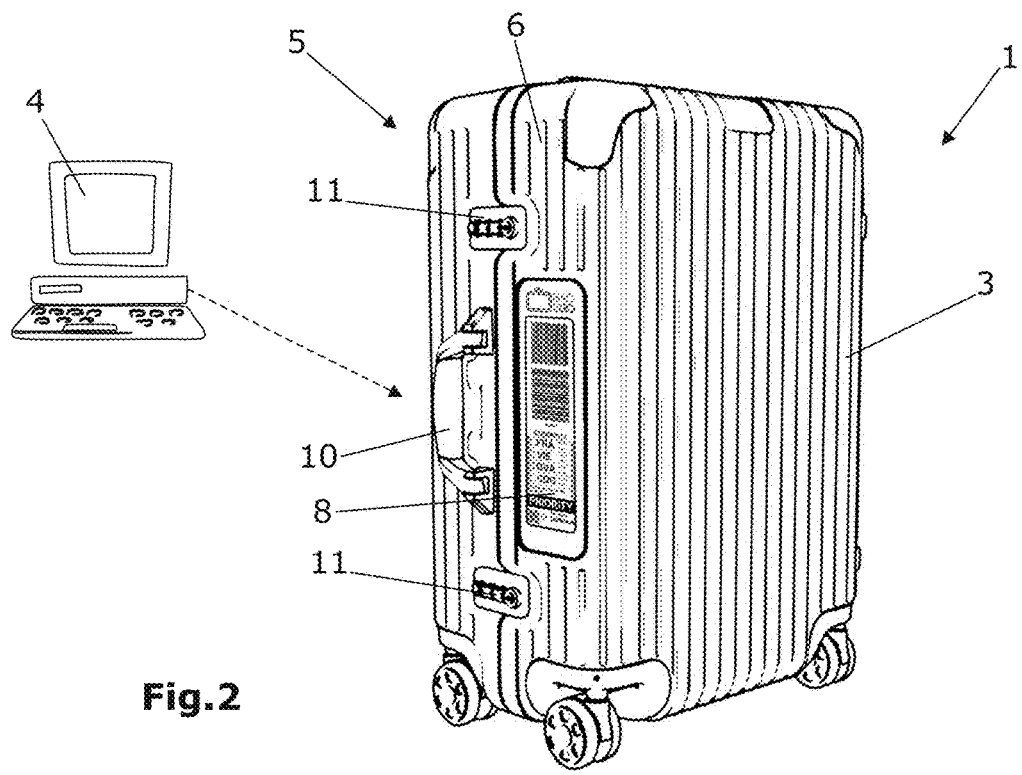
FIG. 2 shows an alternative embodiment.
Figure 3:
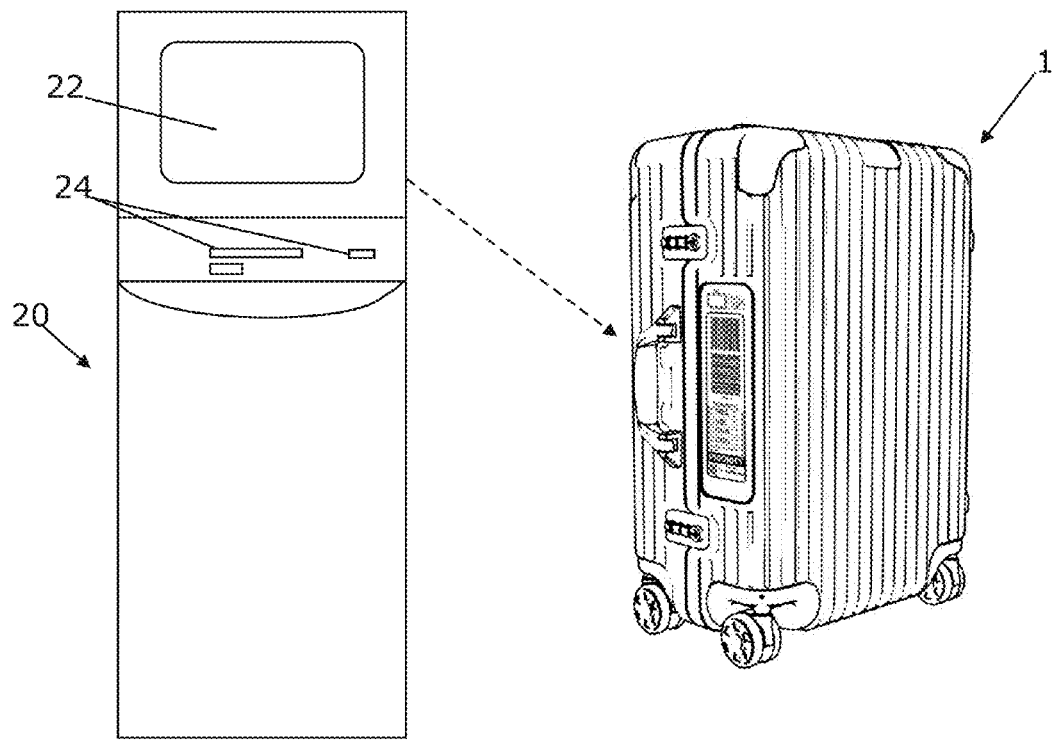
FIG. 3 shows another alternative embodiment.
Figure 4:
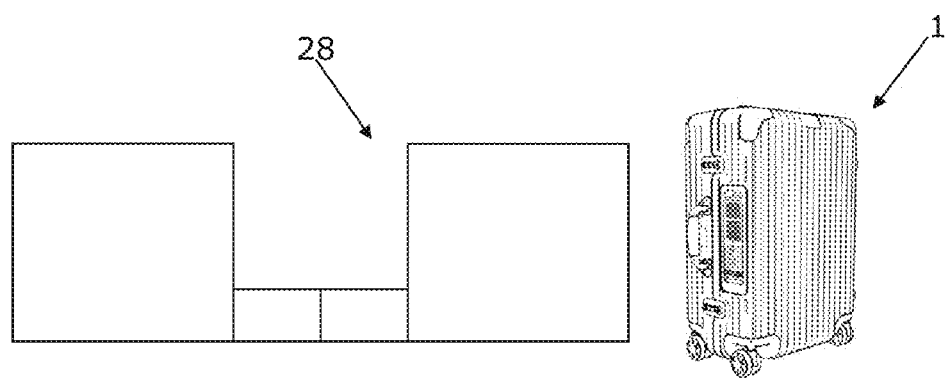
FIG. 4 shows a further alternative embodiment.

FIGS. 2-4 illustrate further alternative embodiments. These differ in that the check-in means is not a cell phone 2, as in FIG. 1, but a computer 4 in FIG. 2, a check-in automat 20 in FIG. 3 with which the check in is effected via a keyboard 24 and the monitor 22. FIG. 4 illustrates a check-in counter 28 where the piece of baggage 1 is checked in by personnel. However, different from the usual procedure, the personnel does not have to attach the paper baggage tag to the piece of baggage 1, but can transmit the flight and personal data from a computer arranged at the check-in counter 28 directly to the piece of baggage 1.

Figure 5:
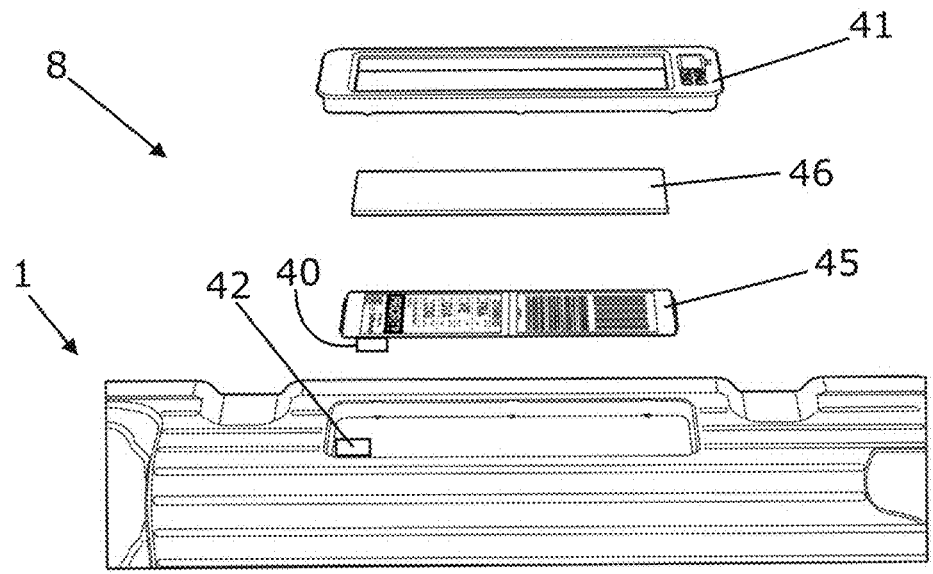
FIG. 5 shows the display means.

FIG. 5 is an exploded view of the display means 8 with a part of the piece of baggage 1. The display means 8 includes a display 45 arranged in a housing 41. The display 45 is covered by a protective glass or a protective film 46. Further, in the embodiment illustrated, the display means 8 includes the activation means 40. The activation means 40 may be a manually actuatable activation means. In the embodiment illustrated, this activation means 40 may be a button that may be operated manually from the inside of the piece of baggage 1. Here, the activation means 40 may extend through a hole in the body 3 of the piece of baggage into the interior of the piece of baggage. As an alternative to the arrangement on the display means 8, the activation mans 40 may also be arranged at the handle 10 or at another site on the body 3 of the piece of baggage. As a further alternative, an external activation means is also possible. Such an external activation means could function in a manner similar to remote control when opening a car.

It is also possible that the display means 8 only allows the transmission of the flight and personal data from certain or previously specified check-in means 2, 4, 26, 28. This may be provided in particular if the activation means 40 is not arranged inside the piece of baggage as illustrated in FIG. 5. If the activation means 40 is arranged for example in the outer surface of the piece of baggage 1, the same may be activated by an unauthorized person, but a transmission of data only takes place when the specified or previously determined check-in means 2, 4, 26, 28 transmits the data.

Figure 6:
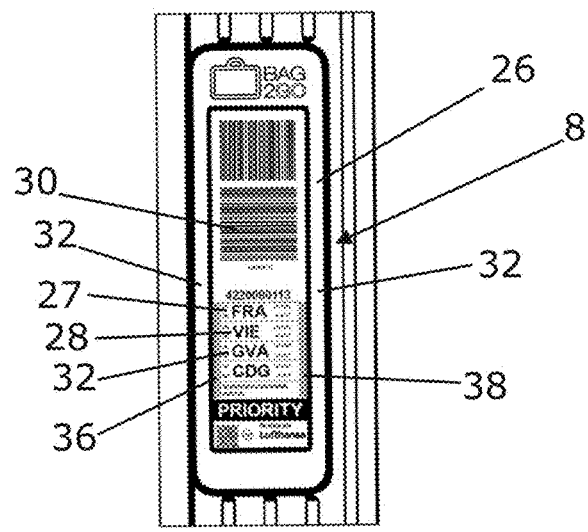
FIG. 6 is a top plan view on a display means of a piece of flight baggage.

In FIG. 6, the display means 8 is shown in more detail. It shows a top plan view on the display means 8 and the display surface 26 of the display means 8. The flight and personal data are represented as barcodes 30 and abbreviations 27, 28, 32 on the display surface 26 of the display means 8. Further, the display surface 26 may be provided with two green bars 36, 38 arranged preferably at the longitudinal edges 32. These green bars 36, 38 may be displayed in particular for flights within Europe. The display 45 of the display means 8 preferably is a currentless display. This means that the display 45 does not need current to permanently show the flight and personal data. Current is needed merely when the displayed content is modified. To this end, the display means 8 may include a battery 44.

A manual activation means has the additional advantage that with a currentless display, the display means 8 is set ready for receipt only after the actuation of the activation means and that it requires current only during that time.

Figure 7:
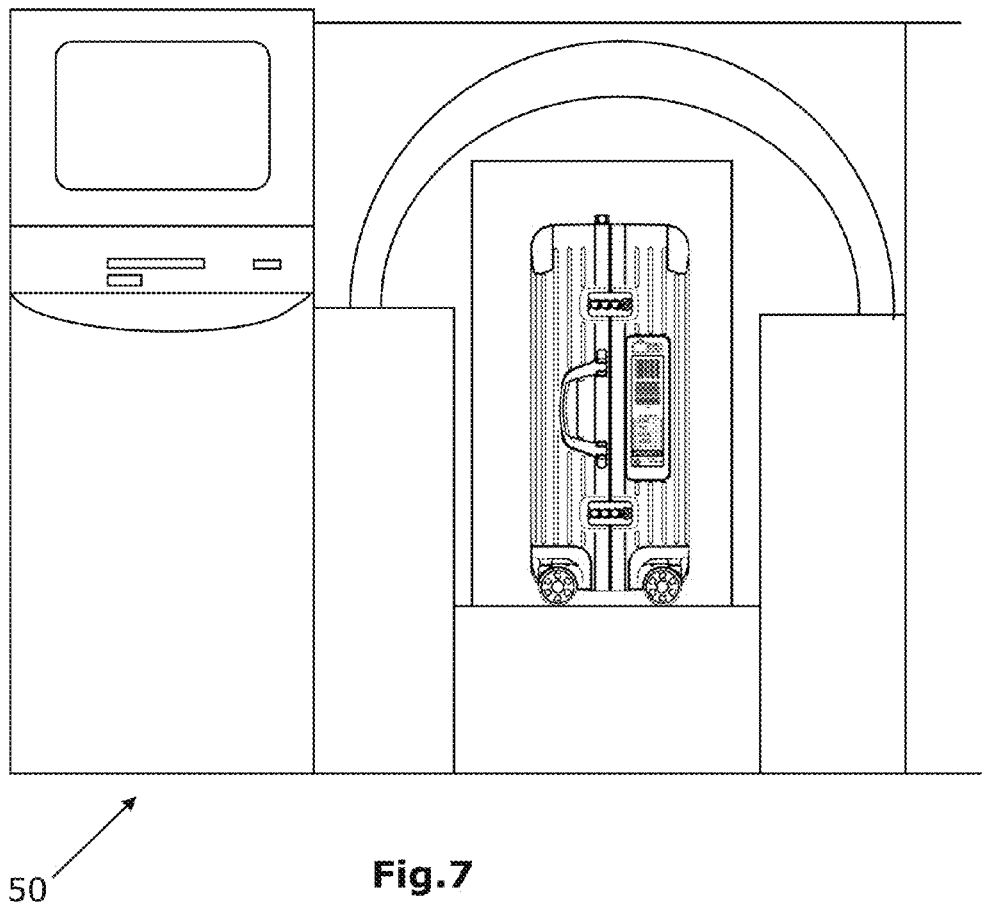
FIG. 7 shows a baggage drop-off means.

FIG. 7 illustrates a baggage drop-off means 50. In the embodiment illustrated, FIG. 7 shows a self-service drop-off counter. At this counter, a passenger can hand in the piece of baggage himself. Previously, it was necessary to print a conventional paper baggage tag to be attached to the piece of baggage by the passenger. The present system and the present method have the advantage that dropping off the piece of flight baggage is greatly simplified, since the flight and personal data can be transmitted by the passenger directly to the display means in advance or the transmission is performed electronically directly on site. A cumbersome attachment of the adhesive strip of the paper baggage tag is not required. By means of a RFID chip arranged in the display means, the drop-off counter can automatically detect that a display means with the flight and personal data displayed thereon has been placed thereon. As an alternative, the scanning means of the self-service drop-off counter can scan the display service 26 of the display means 9 to detect that a display means with the flight and personal data displayed thereon is arranged in the piece of flight baggage 1.

FIG. 8 and FIG. 9 illustrate a detail of a body 3 of a piece of baggage of a piece of flight baggage 1. The body 3 of the piece of baggage has a first part 11 of the piece of baggage and a second part 12 of the piece of baggage, wherein a handle 10 may be arranged on the outer side of the second part 12 of the piece of baggage. In the first part 11 of the piece of baggage, a display means 8 with a display 45 may be integrated. In the embodiment illustrated the integrated display means 8 comprises an activation means 40 (not illustrated) on the inner side, which is protected against unintentional actuation by a shielding means 42. The activation means 40 may be a button 40. The activation means 40 is located below the shielding means 42 illustrated. The shielding means 42 has a channel 47 leading from the opening 43 to the activation means 40. FIGS. 8 and 9 show the piece of flight baggage 1 in the open state, with the opening 43 of the shielding means 42 being accessible. The preferably manually actuable activation means 40 may be actuated by passing a finger through the channel 47 via the opening 43 to the activation means 40.

FIG. 10 is an inside view of the piece of baggage in the closed state, wherein, in the embodiment illustrated, the opening 43 of the shielding means 42 is covered or closed by the inner surface of the second part 12 of the piece of baggage. Thus, it is no longer possible to actuate the activation means 40 by engaging into the channel 47 of the shielding means 42. Likewise, the shielding means 42 protects the activation means against unintentional actuation of the activation means by, for example, objects located inside the body 3 of the piece of baggage.

FIG. 11 is an inside view of an alternative embodiment of a body 3 of a piece of baggage, with the display means 8 being integrated on the first part 11 of the piece of baggage. The display means 8 comprises an activation means 40 (not illustrated) located below the shielding means 42. The activation means 40 is accessible via the opening 43 and the channel 47 of the shielding means 42. On the second part 12 of the piece of baggage, a closing means 48 is arranged opposite the opening 43 of the shielding means 42. The closing means 48 is adapted to the geometry of the opening 43 of the shielding means 42.

FIG. 12 shows an inside view of the alternative embodiment of the piece of baggage 1 in the closed state. The closing means 48 covers or encloses the opening 43 of the channel 47 of the shielding means 42. Thus, the activation means 40 is no longer accessible in the closed state of the piece of baggage 1 so that an actuation of the activation means 40 is prevented in the closed state of the piece of baggage 1.

The invention claimed is:

1. A method for identifying baggage, comprising:
    activating an electronic display in order to set the display ready for receipt, the display being integrated in the piece of flight baggage and configured as an electronic tag;
    transmitting flight and personal data necessary for a flight from a check in mechanism to the display; and
    representing the flight and personal data graphically on a display surface of the display,
    wherein the electronic display is activated by manual activation of an activation mechanism arranged on the piece of flight baggage, and wherein the activation mechanism is arranged inside the piece of flight baggage.

2. The method of claim 1, wherein the display is ready for receipt only within a defined time window after activation of the display.

3. The method of claim 1, wherein the check-in mechanism is a cell phone, a computer, a check-in counter or a check-in automat.

4. The method of claim 1, wherein the activation mechanism is protected against unintentional actuation by a shielding mechanism.

5. The method of claim 1, wherein the dimensions and the arrangement of the graphical display of the flight and personal data on the display surface of the display corresponds to the dimensions and the arrangement of the indications on a conventional paper tag.

6. The method of claim 1, wherein the display comprises a currentless display.

7. The method of claim 1, wherein the flight and personal data are transmitted via Bluetooth.

8. The method of claim 1, wherein two green bars are displayed at a defined distance from each other preferably at the longitudinal edges of the display.

9. The method of claim 1, wherein the graphic representation of the flight and personal data shown on the display surface of the display are scanned for automatic baggage transportation.

10. The method of claim 1, wherein, when dropping off the piece of flight baggage, it is automatically detected by an RFID chip arranged on the display, whether a display with an electronic tag is present.

11. A system for identifying a piece of flight baggage, in particular a suitcase, comprising:
    a check-in mechanism on which flight and personal data necessary for a flight can be stored;

a piece of flight baggage with an integrated display designed as an electronic tag; and
an activation mechanism for activating the display integrated in the piece of flight baggage, so as to set the same ready for receipt, wherein it is possible to transmit flight and personal data from the check-in mechanism to the display while the same is ready for receipt,
wherein the flight and personal data are adapted for representation on a display surface of the display, and
wherein the activation mechanism is arranged inside the piece of baggage and is manually actuatable.

12. The system of claim 11, wherein the activation mechanism is arranged on the piece of baggage.

13. The system of claim 11, wherein the activation mechanism is a button arranged on the piece of baggage, preferably on the display.

14. The system of claim 11, wherein a shielding mechanism is provided that protects the activation mechanism against unintentional actuation.

15. A piece of flight baggage, comprising:
a body of a piece of baggage, wherein a display is arranged on the body of the piece of baggage and the body of the piece of baggage being openable and closable,
wherein an activation mechanism, by which the display may be activated, is arranged on the body of the piece of baggage, and
wherein the activation mechanism is arranged inside the body of the piece of baggage and is adapted for manual operation.

16. The piece of flight baggage of claim 15, wherein the body of the piece of baggage is composed of at least one first part of the piece of baggage and at least one second part of the piece of baggage, whereby the piece of flight baggage may be opened and closed.

17. The piece of flight baggage of claim 15, wherein a shielding mechanism is provided which protects the activation mechanism against unintentional actuation.

18. The piece of flight baggage of claim 17, wherein the shielding mechanism is arranged directly on the body of the piece of baggage and/or on the display.

19. The piece of flight baggage of claim 17, wherein the shielding mechanism is formed by a channel arranged in front of the activation mechanism and has an opening.

20. The piece of flight baggage of claim 19, wherein the channel opening of the actuation mechanism is covered in the closed state of the piece of baggage.

21. The piece of flight baggage of claim 19, wherein the channel of the shielding mechanism is arranged on the first part of the body of the piece of baggage, and the channel opening is covered by the second part of the piece of baggage when the piece of baggage is in the closed state.

22. The piece of flight baggage of claim 19, wherein in the closed state of the piece of baggage, the opening is covered by a closing mechanism.

23. The piece of flight baggage of claim 22, wherein the closing mechanism is arranged on the second part of the piece of baggage.

24. A method for identifying baggage, comprising:
activating an electronic display in order to set the display ready for receipt, the display being integrated in the piece of flight baggage and configured as an electronic tag,
transmitting flight and personal data necessary for a flight from a check in mechanism to the display,
representing the flight and personal data graphically on a display surface of the display,
wherein the electronic display is activated by manual activation of an activation means arranged on the piece of flight baggage,
wherein the activation means is protected against unintentional actuation by a shielding means, and
wherein the shielding means is formed by a channel arranged in front of the activation means and having an opening.

25. The method of claim 24, wherein the display is ready for receipt only within a defined time window after activation of the display.

26. The method of claim 24, wherein the check-in mechanism is a cell phone, a computer, a check-in counter or a check-in automat.

27. The method of claim 24, wherein the activation means may be arranged inside the piece of flight baggage.

28. The method of claim 24, wherein the dimensions and the arrangement of the graphical display of the flight and personal data on the display surface of the display corresponds to the dimensions and the arrangement of the indications on a conventional paper tag.

29. The method of claim 24, wherein the display comprises a currentless display.

30. The method of claim 24, wherein the flight and personal data are transmitted via Bluetooth.

31. The method of claim 24, wherein two green bars are displayed at a defined distance from each other preferably at the longitudinal edges of the display.

32. The method of claim 24, wherein the graphic representation of the flight and personal data shown on the display surface of the display are scanned for automatic baggage transportation.

33. The method of claim 24, wherein, when dropping off the piece of flight baggage, it is automatically detected by means of a RFID chip arranged on the display, whether a display with an electronic tag is present.

34. A system for identifying a piece of flight baggage, in particular a suitcase, comprising:
a check-in mechanism on which flight and personal data necessary for a flight can be stored,
a piece of flight baggage with an integrated display designed as an electronic tag,
an activation means for activating the display means integrated in the piece of flight baggage, so as to set the same ready for receipt, wherein it is possible to transmit flight and personal data from the check-in means to the display means while the same is ready for receipt,
wherein the flight and personal data are adapted for representation on a display surface of the display,
wherein a shielding means is provided that protects the activation means against unintentional actuation, and
wherein the shielding means is formed by a channel arranged in front of the activation means and having an opening.

35. The system of claim 34, wherein the activation means is arranged on the piece of baggage, preferably on the display means.

36. The system of claim 34, wherein the activation means is arranged inside the piece of baggage and is manually actuatable.

37. The system of claim 34, wherein the activation means is a button arranged on the piece of baggage, preferably on the display.

38. A piece of flight baggage, comprising:
a body of a piece of baggage, wherein a display is arranged on the body of the piece of baggage and the body of the piece of baggage being openable and closable,
wherein an activation means, by which the display may be activated, is arranged on the body of the piece of baggage, preferably on the display,
wherein a shielding means is provided which protects the activation means against unintentional actuation, and
wherein the shielding means is formed by a channel arranged in front of the activation means and having an opening.

39. The piece of flight baggage of claim 38, wherein the body of the piece of baggage is composed of at least one first part of the piece of baggage and at least one second part of the piece of baggage, whereby the piece of flight baggage may be opened and closed.

40. The piece of flight baggage of claim 38, wherein the activation means is arranged inside the body of the piece of baggage and is adapted for manual operation.

41. The piece of flight baggage of claim 38, wherein the activation means is a button arranged on the piece of baggage, preferably on the display.

42. The piece of flight baggage of claim 38, wherein the shielding means is arranged directly on the body of the piece of baggage and on the display.

* * * * *